(12) United States Patent
Easton et al.

(10) Patent No.: US 6,590,886 B1
(45) Date of Patent: Jul. 8, 2003

(54) TECHNIQUE FOR REDUCTION OF AWAKE TIME IN A WIRELESS COMMUNICATION DEVICE UTILIZING SLOTTED PAGING

(75) Inventors: Kenneth D. Easton, San Diego, CA (US); Arthur J. Neufeld, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/118,750

(22) Filed: Jul. 17, 1998

(51) Int. Cl.[7] .............................................. H04B 7/216
(52) U.S. Cl. ...................................................... 370/342
(58) Field of Search ................................. 370/320, 335, 370/342, 441, 479, 311; 455/38.3, 343, 574; 375/347, 349

(56) References Cited

U.S. PATENT DOCUMENTS

| | | | | |
|---|---|---|---|---|
| 5,109,390 A | * | 4/1992 | Gilhousen et al. | 370/335 |
| 5,392,287 A | * | 2/1995 | Tiedemann, Jr. et al. | 370/311 |
| 5,469,468 A | * | 11/1995 | Schilling | 375/200 |
| 5,491,718 A | | 2/1996 | Gould et al. | 375/205 |
| 5,596,571 A | * | 1/1997 | Gould et al. | 370/335 |
| 5,644,576 A | * | 7/1997 | Bauchot et al. | 370/437 |
| 5,666,657 A | * | 9/1997 | Kampe et al. | 455/38.3 |
| 5,670,964 A | * | 9/1997 | Dent | 342/457 |
| 5,867,400 A | * | 2/1999 | El-Ghoroury et al. | 364/490 |
| 5,910,944 A | * | 6/1999 | Callicotte et al. | 370/311 |
| 5,930,706 A | * | 7/1999 | Raith | 455/422 |
| 5,950,131 A | * | 9/1999 | Vilmur | 455/434 |
| 6,075,811 A | * | 6/2000 | Naruse et al. | 375/206 |

FOREIGN PATENT DOCUMENTS

GB          2324225          10/1998          ............ H04Q/7/32

* cited by examiner

Primary Examiner—Chau Nguyen
Assistant Examiner—Jasper Kwoh
(74) Attorney, Agent, or Firm—Philip R. Wadsworth; Charles D. Brown; Kevin T. Cheatham (57) ABSTRACT

The present invention is an improved method and circuit for reducing the amount of time a mobile receiver spends in the active phase of a slot in a communications system utilizing a slotted paging mechanism. The invention allows the awake time to be configured for the minimum interval needed to demodulate the paging channel messages of interest. The invention includes a means to adjust the timing reference of the fingers to compensate for a sleep duration not an integral multiple of the PN sequence period, and a means to adjust the deinterleaver frame reference timing to compensate for a sleep duration not an integral multiple of the frame interval, and a means to initialize the frequency tracking, gain scaling, and DC bias loops, if any, of the analog receiver chain to minimize the time needed to re-lock these loops.

7 Claims, 8 Drawing Sheets

TECHNIQUE FOR REDUCTION OF AWAKE TIME IN A WIRELESS COMMUNICATION DEVICE UTILIZING SLOTTED PAGING

BACKGROUND OF THE INVENTION

The present invention relates to mobile communications systems such as cellular telephone systems, and, more specifically, to a system for reducing power consumption in a portable telephone of such a system.

A cellular telephone call can be generally described as having two modes: talk and standby. A mobile station in talk mode actively exchanges data on a traffic channel, such as that for a voice or data call. In between calls, a mobile station remains in standby mode, where it must monitor a paging channel to receive messages from a base station, such as the receipt of a page necessary to initiate a call.

Since only a small fraction of the messages on the paging channel are addressed to any particular mobile station, a mobile station can reduce its power consumption, and hence increase its standby time and battery life, by periodically rather than continuously monitoring a channel for incoming messages. Such a system, often referred to in the art as a slotted paging channel, has been described in U.S. Pat. No. 5,392,287 entitled "APPARATUS AND METHOD FOR REDUCING POWER CONSUMPTION IN A MOBILE RECEIVER", issued Feb. 21, 1995, assigned to the assignee of the present invention and incorporated herein by reference.

In the just-mentioned patent, a communication system is described having a fixed transmitter and one or more mobile stations, in which periodic messages from the transmitter to the mobile stations are scheduled in time "slots." Each mobile station is assigned a time slot during which it monitors transmissions. The transmitter transmits messages to a particular mobile station only during the slot assigned to that mobile station. The mobile station 30, goes into an "active state" during its assigned slot. It may remain in the active state after its assigned slot if the message requires the receiver to perform additional actions. This active state is often referred to as the "awake" state.

Messages transmitted on the paging channel from the transmitter to the mobile station may include those for alerting the mobile station to the presence of an incoming call (i.e. a "page" message") and those for periodically updating system parameters in the mobile receiver (i.e. "overhead" messages). A list of exemplary messages found on a typical paging channel may be found in Telecommunications Industry Association (TIA)/Electronic Industries Association (EIA) Interim Standard IS-95, entitled "Mobile Station-Base Station Compatibility Standard for Dual-Mode Wideband Spread Spectrum Cellular System," at section 7.7.2.1. Each of the messages described in this section may contain a field that indicates whether another message is forthcoming. If a mobile station receives a message indicating that an additional message is forthcoming, the mobile station will remain in the awake state to receive additional messages. Once there are no additional messages, the mobile station may immediately enter an inactive state. During the time period between successive occurrences of its assigned slot, the mobile station may conserve power during this time by shutting off power and/or clocks to one or more components. For example, the components used for monitoring the transmissions are not needed outside a mobile station's assigned slot since no data for that mobile station will be sent. This inactive state is often referred to as a "sleep" state.

When a mobile station is in standby mode, the average current consumed across a slot determines the amount of standby time that can be achieved with a given battery size. The average current consumed across a slot equals the awake current weighted by the fraction of time spent in the awake phase of the slot, summed with the sleep current weighted by the fraction of time spent in the sleep phase of the slot.

For a given battery size, standby time can be improved by reducing the average current consumed across a slot. This can be achieved by either reducing the current consumed in the awake phase, reducing the current consumed in the sleep phase, or by spending less time in the awake phase and more time in the sleep phase. Typically the fraction of time spent in the awake phase is a much smaller interval than the fraction of time in the sleep phase, but since the active phase current is generally many times greater than sleep phase current, any reduction in the amount of time spent in the awake phase can result in a direct and significant improvement in standby time.

In order for the message to be decoded with high reliability, the awake time must include the time needed to reinitialize the analog receiver chain to provide valid receive samples, the time needed to search these samples for multipath and assign fingers to provide a valid symbol stream, and the time needed to initialize the state metrics with the symbol stream before the symbols associated with the message of interest. During the initialization of the analog receiver chain, the frequency synthesizer used to mix the received signal down to baseband frequency must come into lock, and gain scaling and DC bias loops, if any, must lock to provide a valid baseband receive sample stream. The paging channel used in IS-95 is continuously encoded with a K=9 rate ½ convolutional code. Several constraint lengths of symbols must be provided to the Viterbi decoder to initialize its state metric values in advance of the symbols of interest.

To demodulate the paging channel, the mobile needs to acquire a precise timing reference for each of the multipath components that comprise the received waveform. Demodulator fingers, each with their own specific time reference, are assigned to the individual multipath components. Each finger despreads the receive samples at its assigned time reference. The despread results from each finger are then combined to form a single symbol stream for decoding. Such a demodulator, known as a RAKE receiver, is described in U.S. Pat. No. 5,109,390 entitled "DIVERSITY RECEIVER IN A CDMA CELLULAR TELEPHONE SYSTEM", issued Apr. 28, 1992, assigned to the assignee of the present invention and incorporated herein by reference.

During initial power-on acquisition, all possible shifts of the PN sequences are searched to acquire the timing references for each finger. Searching each PN offset can take anywhere from hundreds of milliseconds to a few seconds depending on the channel conditions during acquisition. Performing such a full reacquisition at the start of every slot in standby mode would take too long and consume too much standby current for a practically sized portable phone battery. Instead, the clock to the demodulator circuit is gated off for a precise duration of time which is designed so that the circuits are automatically aligned with the system when their clocks are gated back on. The time period is measured by a sleep timer clocked off a high precision oscillator. During the sleep interval, only the oscillator and the sleep timer are active.

In IS-95 systems, the interleaver in the transmitter and the deinterleaver in the mobile station process data on 20 ms frame boundaries, and both must be aligned with each other. The PN generators in the transmitter and the mobile station have sequence lengths of $2^{15}$. Each PN generator updates at a rate of 1.2288 MHz and so the PN sequence period is 26.66 ms. The PN generators in the mobile station must be aligned with the respective PN generators in the transmitter. The smallest period that is common to both the interleaver/deinterleaver timing and the PN sequence timing is 80 ms. Exactly 3 PN sequence periods of 26.66 ms and exactly 4 interleaver frames of 20 ms fit into an 80 ms period. More generally, the sleep interval is programmed in steps of the least common multiple of the two intervals.

The sleep timer is programmed to sleep for a multiple of the 80 ms period to ensure that both the timing reference of the fingers and the frame reference timing of the deinterleaver do not change with respect to actual time, or "wall clock" time. If the sleep timer is programmed with a value other than a multiple of 80 ms, when the demodulator wakes up the PN generators and/or the interleaver timing will not be aligned with the proper system time and demodulation will be impossible.

After the sleep timer expires, the demodulator circuits are re-enabled. The demodulator circuits are aligned with the transmitter, and the fingers are demodulating at the offsets that were optimal for the multipath environment that was present prior to the previous sleep. Since the multipath environment will probably have changed during the sleep interval, the optimal finger assignments can be reacquired with a short search of PN offsets centered around the multipath that was present in the previous slot cycle, avoiding the need to search through all possible PN offsets of the PN sequence.

SUMMARY OF THE INVENTION

The present invention is an improved method and circuit for reducing the amount of time a mobile station spends in the active phase of a slot in a communications system utilizing a slotted paging mechanism. Instead of an awake time quantized to increments of the least common multiple of the PN sequence period and the deinterleaver frame duration, the invention allows the awake time to be configured for the minimum interval needed to initialize the analog receiver chain, reacquire the finger time references, initialize decoder state metrics, and demodulate the paging channel messages of interest.

The invention adjusts the timing reference of the fingers to compensate for a sleep duration not an integral multiple of the PN sequence period, and adjusts the deinterleaver frame reference timing to compensate for a sleep duration not an integral multiple of the frame interval. In addition, the invention initializes the frequency tracking, gain scaling, and DC bias loops, if any, of the analog receiver chain to minimize the time needed to relock these loops.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

The present invention is particularly useful in a wireless communication device or mobile station such as a portable radiotelephone which operates its receiver using a slotted paging mechanism. In slotted paging operation, the receiver remains asleep during its non-assigned paging slots, and awakens promptly before its assigned paging slot as described above with reference to the incorporated U.S. Pat. No. 5,392,287. The mobile station sleeps for a programmed number of time periods. The mobile station must awaken at least one time period before the assigned paging slot in order to prepare to demodulate the paging channel.

In the preferred embodiment of this invention the IS-95 standard is used. The PN spreading sequence repeats every $2^{15}$ chips with a chip rate of 1.2288 MHz. Thus the PN sequence period is 26.66 ms. 26⅔ ms, with a decimal approximation equal to. The deinterleaver frame spans 20 ms, so in the preferred embodiment, 80 ms is the least common multiple of both the 20 ms channel frames and the 26.66 ms PN sequence repetitions. The slot cycle duration is a multiple of 80 ms, typically 1.28, 2.56, or 5.12 seconds. IS-95 uses a continuous convolutional code. In order for a Viterbi decoder to reliably decode a continuous convolutional code such as that used on the IS-95 paging channel, it requires approximately 18 to 20 ms worth of valid symbols ahead of the slot boundary to initialize the state metrics of the decoder for decoding the message starting on the slot boundary.

Figure 1:
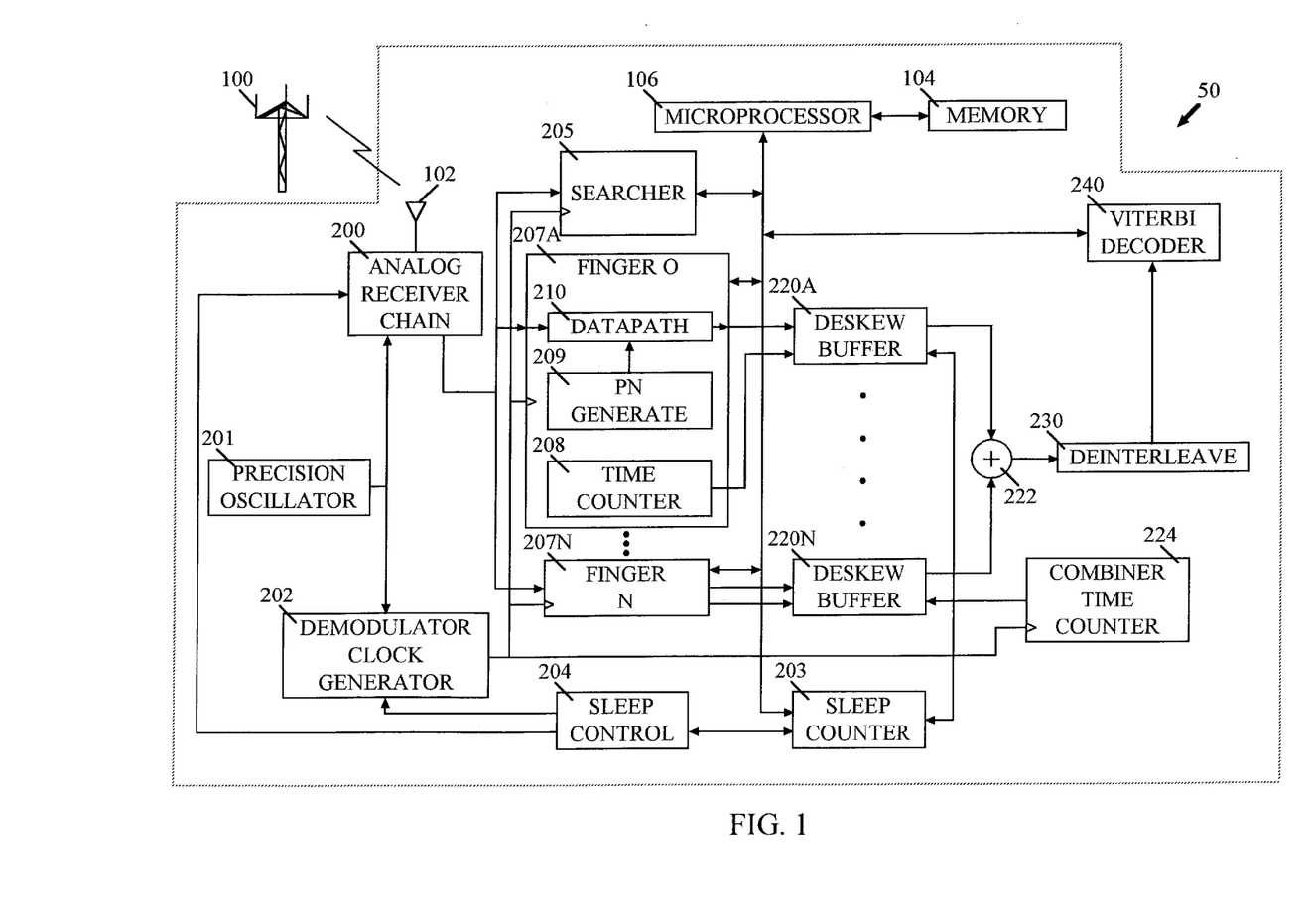
FIG. 1 is a functional block diagram of the circuit of the present invention.

FIG. 1 shows a block diagram of an IS-95 system. Transmitter 100 transmits to the mobile station 50. During initial acquisition, analog receiver chain 200 is initialized to provide valid baseband samples from the signals received on antenna 102. Searcher 205 is programmed by microprocessor 106 to correlate the received samples at all possible PN offsets to acquire the timing references of the multipath signals from any reflections or nearby transmitters. Microprocessor 106 under the control of software instructions stored in memory 104 then directs each of fingers 207a–207n to adjust their timing reference to the one of the multipath signals identified by searcher 205. This adjustment is made by either speeding up or slowing down finger time counter 208 and PN sequence generator 209. Finger time counter 208 and PN sequence generator 209 increment every chip and reset after counting $2^{15}$ chips. Once at the assigned timing reference, fingers 207a–207n despread the receive samples using a PN sequence shift appropriate for their particular timing reference. The despread samples are integrated over a symbol duration and weighted by the strength of the multipath signal being tracked via finger datapath 210. Each of fingers 207a–207n writes the resulting symbol into the respective deskew buffer 220a–207n using its time counter 208 as the write index. Since each finger of 207a–207n is at a different assigned offset, the like-indexed symbols from each finger are written into the deskew buffers 220a–220n at different times.

Combiner time counter 224 is delayed from the time reference of the fingers. Combiner time counter 224 increments every chip and resets after counting 80 ms of chips.

Using combiner time counter 224 as the read index into each finger section of deskew buffers 220a–220n, the like-indexed symbols from each finger are read together and are time aligned. The time aligned symbols are summed together by combiner summer 222 and provided to the deinterleaver 230. The deinterleaved symbols are subsequently provided to the Viterbi decoder 240 for further processing, as known in the art. In the preferred embodiment, deskew buffers 220a–220n are 8 symbols deep, and combiner time counter 224 is initialized to a state which is four symbols delayed from finger time counter 208 of the finger tracking the earliest multipath signal.

After monitoring its assigned paging channel slot, and seeing no more messages for mobile station 50, microprocessor 106 sends a command to sleep controller 204 to go to sleep and programs sleep counter 203 to count the duration of the sleep interval. Sleep controller 204 then directs the mobile station to enter the sleep phase of the slot and starts sleep counter 203. Sleep controller 204 sends a disable signal to the input of demodulator clock generator 202 and sends a power down signal to the analog receiver chain 200. Using precision oscillator 201 as a clock source, sleep counter 203 counts down the sleep interval. During the sleep interval, with demodulator clock 202 disabled and analog receiver chain 200 powered down, sleep counter 203 and precision oscillator 201 account for all of the power consumption in the mobile station.

Prior to the expiration of sleep counter 203, analog receiver chain 200 is reinitialized. The time required prior to expiration is based on the warm-up time of analog receiver chain 200 and is typically a few milliseconds. Upon expiration of sleep counter 203, demodulator clock generator 202 is re-enabled and the mobile station enters the awake phase of the slot. Searcher 205 is programmed by microprocessor 106 to correlate receive samples with a small group of PN offsets centered around the multipath present during the previous awake phase. Microprocessor 106 then directs fingers 207a–207n to adjust their timing reference to the multipath signals identified by searcher 205, so that a valid symbol stream is provided to deinterleaver 230 and subsequently to Viterbi decoder 240 to allow for the paging channel message to be decoded.

The foregoing description outlines the fundamental steps in the sleep slot timeline, whether or not the present invention is utilized. In the prior art, the sleep duration was confined to be a multiple of 80 ms, as was the slot duration. If the sleep interval isn't a multiple of the PN sequence period, then when the demodulator circuit is reenabled its finger timing is grossly misaligned relative to the PN sequence used to spread the received signal at the transmitter. If the sleep interval isn't a multiple of the deinterleaver frame interval, when the demodulator circuit is reenabled its deinterleaver start-off-frame reference is grossly misaligned relative to the actual interleaver framing used at the transmitter. The present invention details how the fingers, combiner, and sleep timers are configured to allow proper decoding of the paging message even if the sleep interval is not an integral multiple of either the PN sequence period or the deinterleaver frame interval. This configuration information and the proper sequence of steps is contained in memory 104 and is accessed by microprocessor 106.

Figure 2:
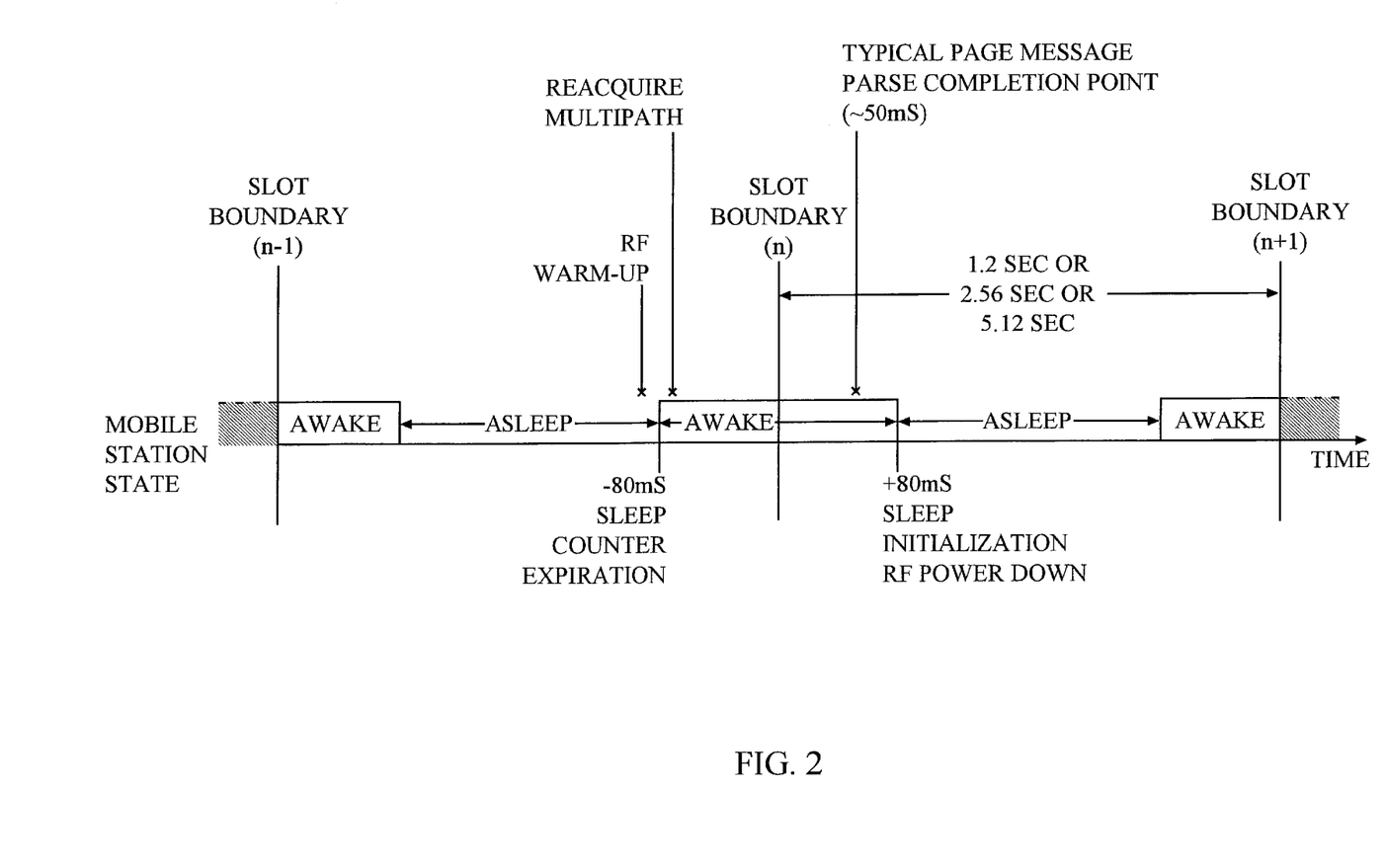
FIG. 2 is a slot timeline without utilizing this invention.
Figure 3:
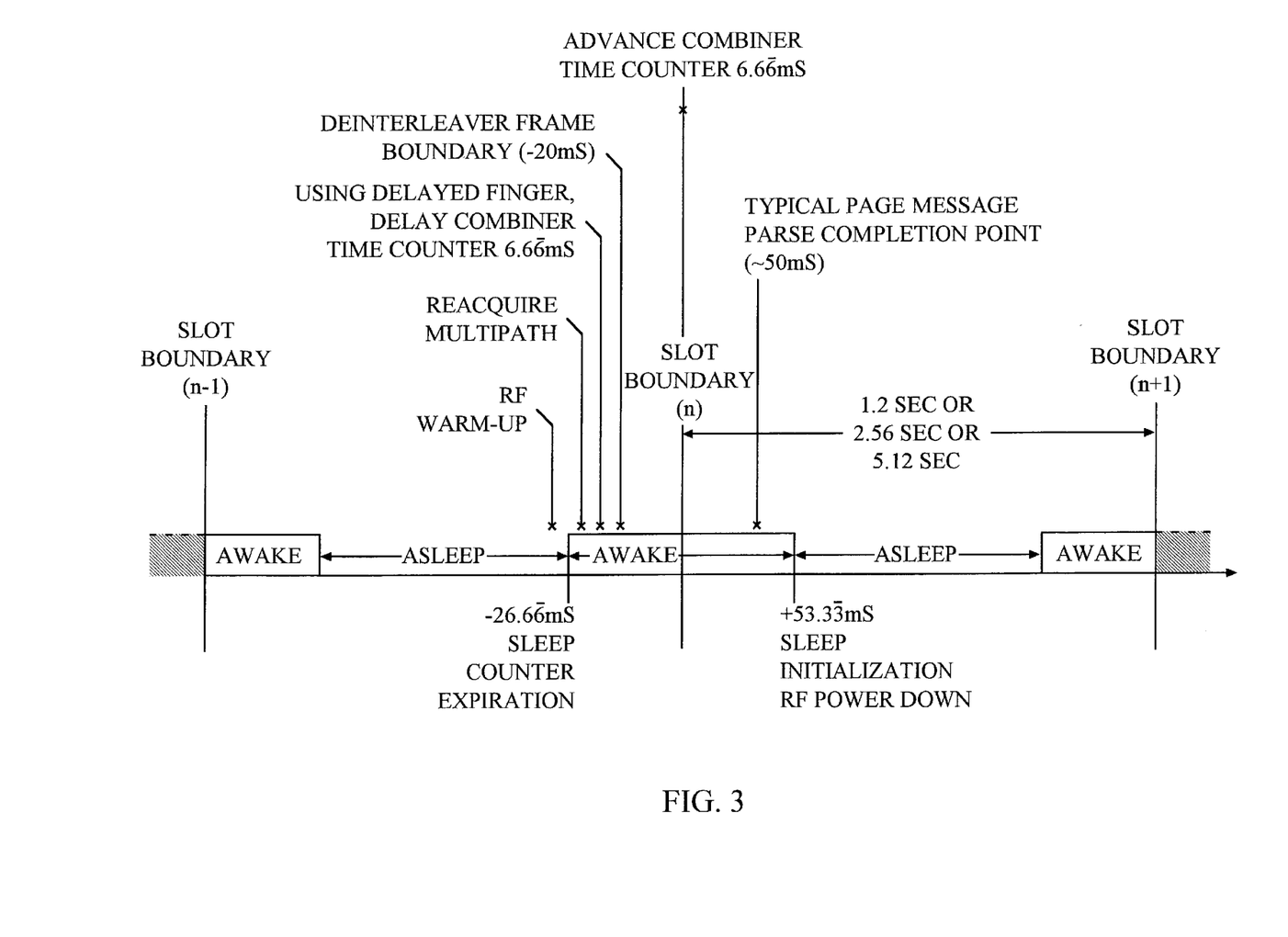
FIG. 3 is a slot timeline utilizing this invention in the preferred embodiment of this invention.

FIG. 2 depicts a typical slot timeline from the prior art. The cycle begins at Slot Boundary (n−1) in the awake state. The sleep controller waits until a common multiple of both the deinterleaver frame reference and the PN sequence period, or 80 ms after the slot boundary in the preferred embodiment, before disabling the demodulator clock. The sleep interval is programmed to be the slot interval minus the awake interval, so that the demodulator sleeps until it is reenabled 80 ms before Slot Boundary (n). Given a sleep duration and an awake period that are multiples of the deinterleaver frame interval and the finger PN sequence period, the associated demodulator circuits are unaffected by the gating of the demodulator clock. They maintain their underlying alignment to the PN sequence and deinterleaver framing despite the gated-off sleep interval. The RF circuits are turned on prior to the awake state with enough time to warm up. After wakeup, the multipath must be reacquired. In the timeline of FIG. 3, the minimum duration of the awake phase is 160 ms. Note that a typical message parse completion point is approximately 50 ms after the beginning of Slot Boundary (n).

FIG. 3 shows a typical timeline utilizing this invention in the preferred embodiment. The preferred embodiment takes advantage of some timing and circuits found in some IS-95 implementations. The present invention is not limited to this embodiment, and a more general solution is described more fully below.

The cycle begins at Slot Boundary (n−1) in the awake state. Rather than going to sleep on the 80 ms following Slot Boundary (n−1), the sleep controller disables the demodulator clock on the first 26.66 ms following the parsing of any page messages directed at the mobile station. The sleep interval is programmed to be the slot interval minus the awake interval, so that the demodulator sleeps until it is reenabled 26.66 ms before Slot Boundary (n). While the invention encompasses timelines which do not include a multiple of the PN sequence period, the preferred embodiment restricts the awake interval and sleep periods to multiples of the PN sequence period for ease of implementation. Some additional standby time benefit may result when this restriction is lifted, but the timeline of FIG. 3. is close to optimal. By waking up 26.66 ms before the slot boundary, the mobile station has approximately 6 to 8 ms before symbols need to be valid for proper decoder state-metric initialization which will be required to decode the message starting on the Slot Boundary (n). This time is used to reinitialize the analog receiver chain and reacquire the multipath and assign fingers to demodulate.

While sufficient, this amount of reacquisition time is not overly generous. In order to ensure the paging channel is reacquired before the point at which valid symbols are required for proper decoding, the microprocessor can note the position of the multipath in the previous awake interval and use this to direct a small search centered around this position to speed the searching process. The demodulator closes the frequency tracking, gain scaling and DC bias loops, if any. Once the demodulator goes to sleep, these tracking loops operate in open loop fashion. To assist in their reconvergance, the microprocessor can record the last values observed prior to entering sleep, and several milliseconds before the start of the awake interval can load these values back into the demodulator circuits so that they are driven with a reasonable estimate of the value they are likely to converge to once the demodulator is reenabled. This helps to minimize the amount of awake time that needs to be budgeted for reinitializing the analog receiver chain.

When the demodulator clock is reenabled 26.66 ms before the slot boundary, the deinterleaver frame reference may not have the proper frame alignment needed to demodulate the paging channel (when it does have the proper timing, it is merely a matter of chance). To generate the proper frame alignment, one finger of a plurality of fingers is directed by the microprocessor to delay its time reference exactly 6.66 ms 6⅔ ms, with a decimal approximation equal to from the other fingers, the difference between the PN sequence period and the deinterleaver frame interval. This finger is not used in demodulation, but only to initialize the combiner with a delayed timing reference. The deinterleaver frame alignment is derived from the combiner time counter. This combiner time counter is reinitialized to a nominal depth of 4 symbols from this delayed finger, so that instead of the combiner time counter resetting at the slot boundary it resets exactly 20 ms, or 1 frame before the Slot Boundary (n). Despite the fact the combiner time reference is misaligned relative to a proper slot boundary alignment, it is correct modulo 20 ms so the deinterleaver symbol frame alignment is correct. The 6.66 ms of delay of the combiner time reference from its nominal position would seem to require an equivalent increase in the deskew buffer depth in order for the deskew buffer to operate correctly. But since the 6.66 ms delay is divisible by the 8 symbol length of the deskew buffer, the read pointer used by the combiner is aliased back to the same position it would have been without the delay, so deskew buffer operation is unaffected and the symbol stream provided to the deinterleaver is correctly aligned.

With the proper deinterleaver alignment 20 ms before the slot boundary, the symbols in the frame prior to the slot boundary can be presented to the decoder in the correct deinterleaved order so the state metrics can be initialized. As with the timeline in FIG. 2, the decoder decodes the symbol stream and presents the results to the microprocessor. If no pages requiring a response are received, the microprocessor directs the sleep controller to put the mobile station to sleep on the next combiner 26.66 ms boundary. In the preferred embodiment, this determination can often be made for an idle paging channel after the first frame of decoded data, in which case the sleep controller puts the mobile station to sleep on the first 26.66 ms boundary following the slot boundary, resulting in an awake interval of 53.33 ms 53⅓ ms, with a decimal approximation equal to Otherwise the microprocessor usually directs the sleep controller to put the mobile station to sleep on the second 26.66 ms boundary following the slot boundary, resulting in an awake interval of 80 ms. In either case, the awake interval of FIG. 3 utilizing this invention is substantially less than the 160 ms awake interval of FIG. 2 without the invention. The deinterleaver initialization does not depend on going to sleep at any particular point in time, so the invention realizes gains both on the leading edge of the awake interval in which the timeline is shortened from 80 ms to 26.66 ms and also on the trailing edge, where the demodulator can be gated off as early as the messaging allows it to be without special consideration for the deinterleaver frame alignment.

At some point before the mobile station begins transmitting on the reverse link in response to a received message, the combiner time reference needs to be realigned to the nominal 4 symbol delay from the earliest arriving multipath used in demodulation. This can be done at the slot boundary, or sometime later to allow additional time to parse the first paging channel message following the slot boundary. If the combiner time counter is still on the delayed time reference and the microprocessor directs the sleep controller to put the mobile to sleep on the combiner's first 26.66 ms time boundary, the mobile station will power down 33.33 ms 33⅓ ms, with a decimal approximation equal to after the slot boundary. Rather than sleep a multiple of 26.66 ms, the sleep counter will be programmed for a multiple of 26.66 ms less 6.66 ms so that the demodulator clock is again reenabled 26.66 ms before the next slot boundary.

Figure 4A:
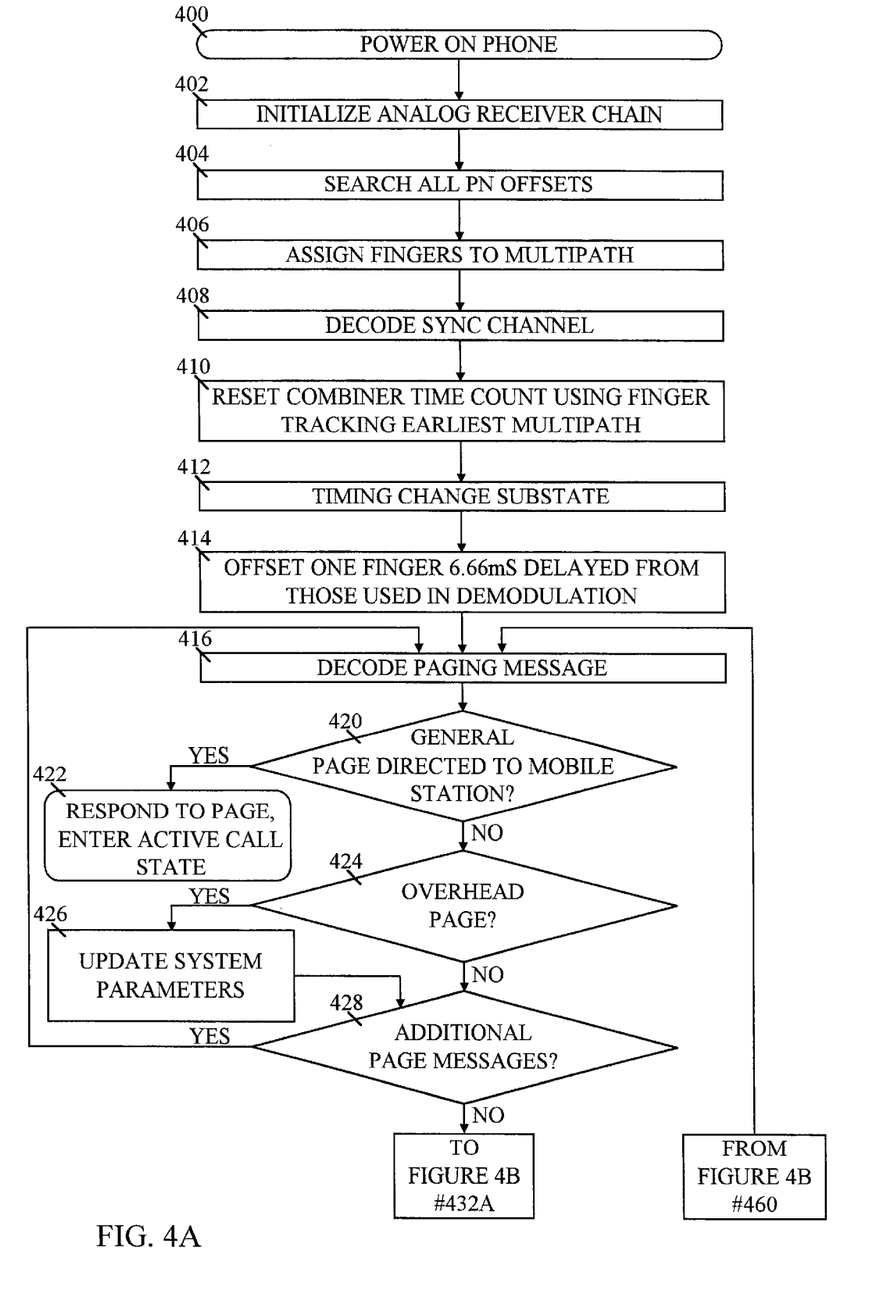
FIG. 4 is a flow chart depicting the steps to perform the preferred embodiment.
Figure 4B:
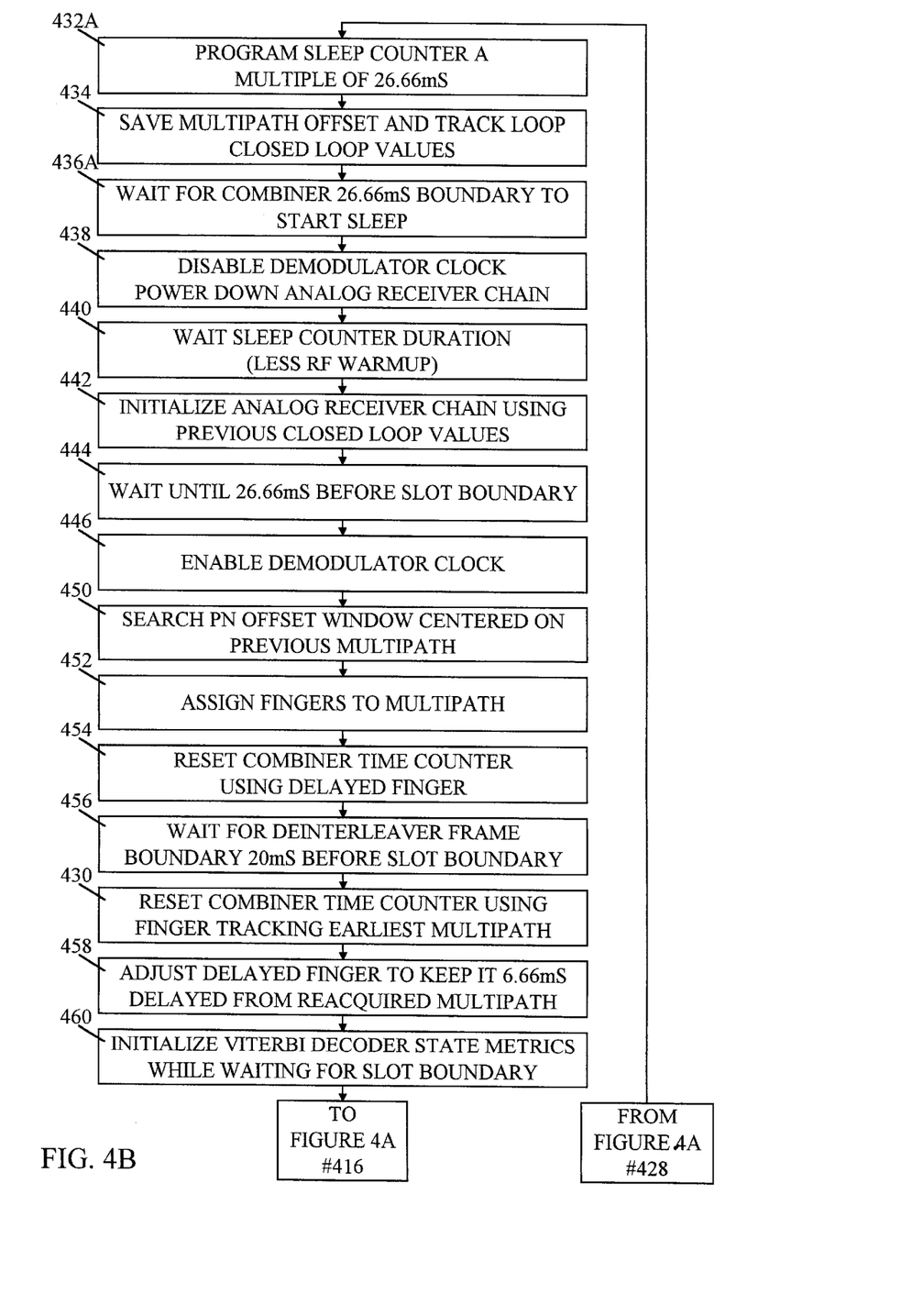

FIG. 4 is a flowchart depicting the steps necessary to perform the preferred embodiment of the present invention. The process begins at block 400 when the mobile station is powered on. From block 400 proceed to 402 and initialize the analog receiver chain. From block 402 proceed to block 404, where the searcher will search all the possible PN offsets. Then proceed to block 406 and assign the fingers to the best multipath signals located by the searcher. Proceed to block 408 and begin to decode the sync channel. From block 408 go to block 410 where the combiner timer count is reset using the finger tracking the earliest multipath. Proceed to 412, the timing change substate. Once the timing change subset is completed, proceed to block 414 and delay one finger 6.66 ms from those used in demodulation. This finger will not be used for demodulation. Proceed to block 416.

In block 416, begin decoding the paging message. Determine in block 420 whether the general page is directed to the particular mobile station. If not, proceed to block 424. If so, proceed to block 422, respond to the page and enter the active call state.

In block 424, determine if the page is an overhead page. If not, proceed to block 428. If so, update the system parameters in block 426 and then proceed to block 428.

In block 428, determine if there are any additional page messages. If so, go back to block 416 and repeat the subsequent steps. If not, proceed to block 432*a*.

In block 432*a*, program the sleep counter to a multiple of 26.66 ms. Proceed to 434 and save the multipath offset and track loop closed loop values. Proceed to 436*a* and wait for the combiner 26.66 ms boundary to start sleep. Proceed to block 438, disable the demodulator clock, and power down the analog receiver chain. Proceed to block 440 and wait for the sleep counter duration less the RF warmup time. Proceed to block 442 and initialize the analog receiver channel using previous closed loop values. Proceed to block 444 and wait until 26.66 ms before slot boundary. Proceed to block 446 and enable demodulator clock. Proceed to block 450 and search the PN offset window centered on the previous multipath. Proceed to block 452 and assign fingers to multipath. Proceed to block 454 and reset the combiner time counter using the delayed finger. Proceed to block 456 and wait for deinterleaver frame boundary 20 ms before slot boundary. Proceed to block 430 and reset combiner time counter using finger tracking earliest multipath. Proceed to block 458 and adjust delayed finger to keep it 6.66 ms delayed from the reacquired multipath. Proceed to 460 and initialize Viterbi decoder state metrics while waiting for slot boundary. Now go back to block 416 to begin decoding the paging message and the subsequent steps outlined above.

The preferred embodiment just described is one of a more general class of timelines in which the programmed sleep interval is not an integral multiple of the PN sequence period. In these cases, to avoid gross PN sequence misalignment, a change in PN masks corresponding to the change in alignment (6.66 ms in the example above) is needed. Instead of the a mask derived from the transmitter PN offset alone, the programmed mask value consists of a base PN offset derived from the transmitter PN offset combined with a phasor component tracking the remainder of the programmed sleep intervals integrated across all previous slots modulo a PN sequence period. Alternately the finger's PN state and time counter can be adjusted, either through a direct write of the value factoring in this same remainder, or indirectly through a timing adjustment commanded by the microprocessor. The latter technique is described in U.S. Pat. No. 5,228,054, entitled "POWER-OF-TWO LENGTH PSEUDO-NOISE SEQUENCE GENERATOR WITH FAST OFFSET ADJUSTMENT", issued Jul. 13, 1998, assigned to the assignee of the present invention and incorporated herein by reference.

In the preferred embodiment described above, one of a plurality of fingers was used to reinitialize the combiner time counter. This indirect method of adjusting the combiner time reference is used in the preferred embodiment, although other means, such as direct overwrite of the combiner time reference with a delayed count can be implemented within the scope of this invention.

Figure 5:
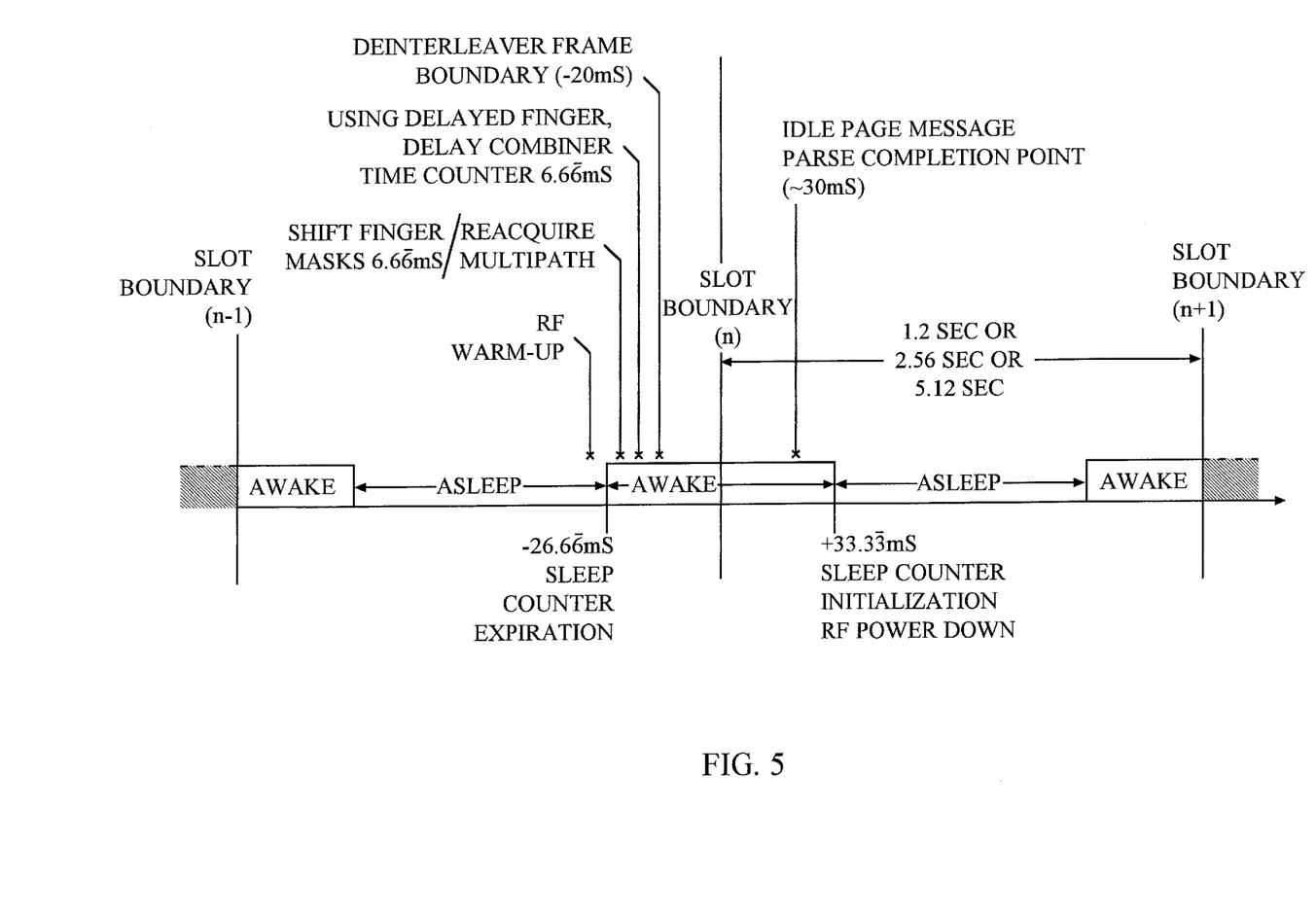
FIG. 5 is a slot timeline utilizing this an alternate embodiment of this invention.

FIG. 5 shows a timeline of an alternate embodiment of the present invention. In this embodiment, the idle page message timing is exploited to allow the mobile station to go back to sleep earlier than was shown in FIG. 3. Since the parsing of an idle page message is typically completed in around 30 ms, the sleepcounter reinitialization and RF powerdown can occur at 33.33 ms, which is 26.66 ms plus 6.66 ms. The extra 6.6 ms is taken care in the steps described fully below.

Figure 6A:
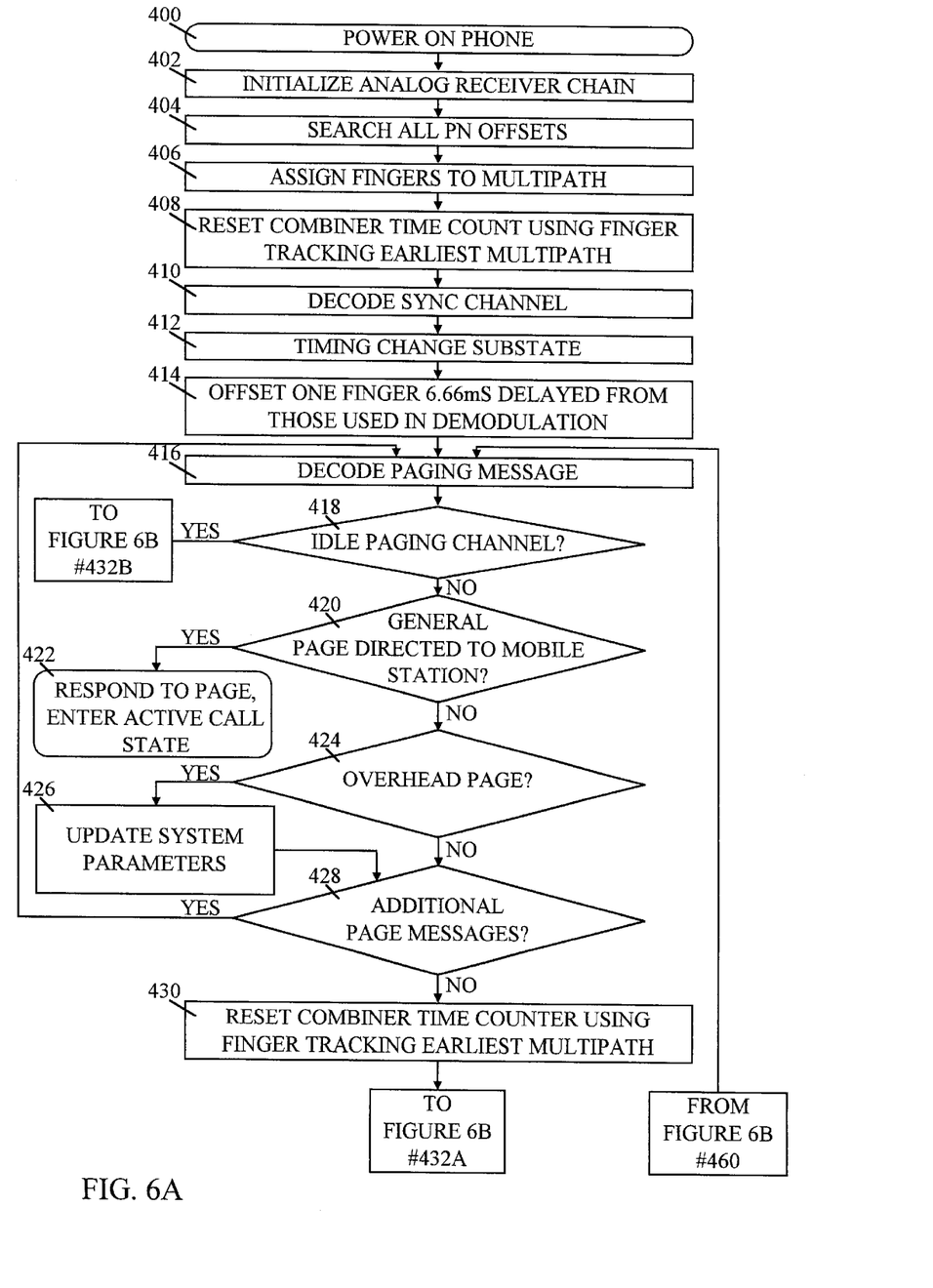
FIG. 6 is a flow chart depicting the steps to perform the alternate embodiment.
Figure 6B:
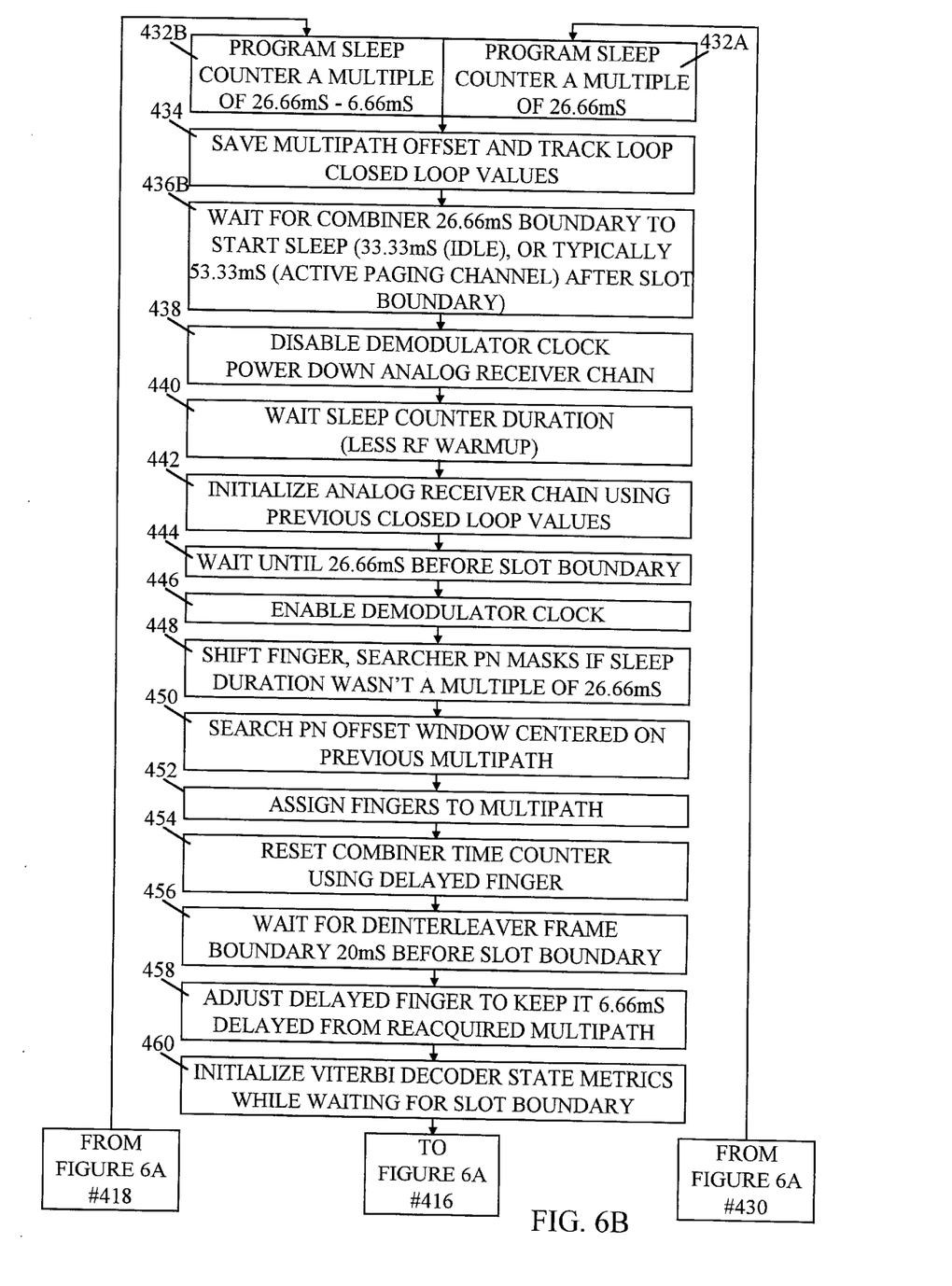

FIG. 6 is a flowchart depicting the steps necessary to perform the just mentioned alternate embodiment of the present invention. The process begins at block 400 when the mobile station is powered on. From block 400 proceed to 402 and initialize the analog receiver chain. From block 402 proceed to block 404, where the searcher will search all the possible PN offsets. Then proceed to block 406 and assign the fingers to the best multipath signals located by the searcher. Proceed to block 408 and begin to decode the sync channel. From block 408 go to block 410 where the combiner timer count is reset using the finger tracking the earliest multipath. Proceed to 412, the timing change substate. Once the timing change subset is completed, proceed to block 414 and delay one finger 6.66 ms from those used in demodulation. This finger will not be used for demodulation. Proceed to block 416.

In block 416, begin decoding the paging message. Determine in block 418 if the paging channel is idle. If so, jump to block 432b, described below. If not, determine in block 420 whether the general page is directed to the particular mobile station. If not, proceed to block 424. If so, proceed to block 422, respond to the page and enter the active call state.

In block 424, determine if the page is an overhead page. If not, proceed to block 428. If so, update the system parameters in block 426 and then proceed to block 428.

In block 428, determine if there are any additional page messages. If so, go back to block 416 and repeat the subsequent steps. If not, proceed to block 430 and reset the combiner time counter using the finger tracking the earliest multipath. Proceed to block 432c.

In block 432c, program the sleep counter to a multiple of 26.66 ms. Proceed to 434 and save the multipath offset and track loop closed loop values. Proceed to 436b and wait for the combiner 26.66 ms boundary to start sleep. Typically this will be 33.33 ms after the slot boundary if the channel is idle and 53.33 ms after the slot boundary when the channel is actively paging. Proceed to block 438, disable the demodulator clock, and power down the analog receiver chain. Proceed to block 440 and wait for the sleep counter duration less the RF warmup time. Proceed to block 442 and initialize the analog receiver channel using previous closed loop values. Proceed to block 444 and wait until 26.66 ms before slot boundary. Proceed to block 446 and enable demodulator clock. Proceed to block 448 and shift finger and searcher PN masks if sleep duration was not a multiple of 26.66 ms. Proceed to block 450 and search the PN offset window centered on the previous multipath. Proceed to block 452 and assign fingers to multipath. Proceed to block 454 and reset the combiner time counter using the delayed finger. Proceed to block 456 and wait for deinterleaver frame boundary 20 ms before slot boundary. Proceed to block 430 and reset combiner time counter using finger tracking earliest multipath. Proceed to block 458 and adjust delayed finger to keep it 6.66 ms delayed from the reacquired multipath. Proceed to 460 and initialize Viterbi decoder state metrics while waiting for slot boundary. Now go back to block 416 to begin decoding the paging message and the subsequent steps outlined above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for receiving a page message in a slotted paging system comprising the steps of:

activating circuitry a time before a scheduled slot for the page message, wherein the time is equal to the duration of a PN sequence and the duration of the PN sequence is 26⅔ milliseconds;

deactivating circuitry once the page message indicates no further processing is necessary; and wherein the activating circuitry step comprises demodulating a received signal at a PN start code time using a first demodulator finger and generating a delayed PN code delayed by 6⅔ miliseconds at a deinterleaver boundary using a second demodulator finger.

2. The method of claim 1 further comprising the step of decoding the page message.

3. The method of claim 1 wherein said page message indicates no further processing is necessary when said page message is directed to another subscriber unit.

4. A subscriber unit for receiving a page message in a slotted paging system comprising:

means for activating circuitry a time before a scheduled slot for the page message, wherein the time is equal to the duration of a PN sequence and the duration of the PN sequence is 26⅔ milliseconds;

means for deactivating said circuitry once the page message indicates no further processing is necessary; and wherein the means for activating circuitry comprises means for demodulating a received signal at a PN start code time using a first demodulator finger and means for generating a delayed PN code delayed by 6⅔ milliseconds at a deinterleaver boundary using a second demodulator finger.

5. The subscriber unit of claim 4 further comprising means for decoding the page message.

6. The subscriber unit of claim 4 wherein said page message indicates no further processing is necessary when said page message is directed to another subscriber unit.

7. A method for intermittently receiving data in a mobile station containing a plurality of demodulating fingers comprising the steps of:

calculating a sleep duration which is a multiple of 26⅔ milliseconds;

programming a plurality of aligned fingers to a time reference;

programming one delayed finger to be delayed by 6⅔ milliseconds from said aligned fingers;

sleeping for said sleep duration; and resetting a deinterleaver timer counter based on timing from said delayed finger.

* * * * *